No. 817,132. PATENTED APR. 3, 1906.
W. H. PALMER, Jr.
STORAGE BATTERY.
APPLICATION FILED FEB. 14, 1905.
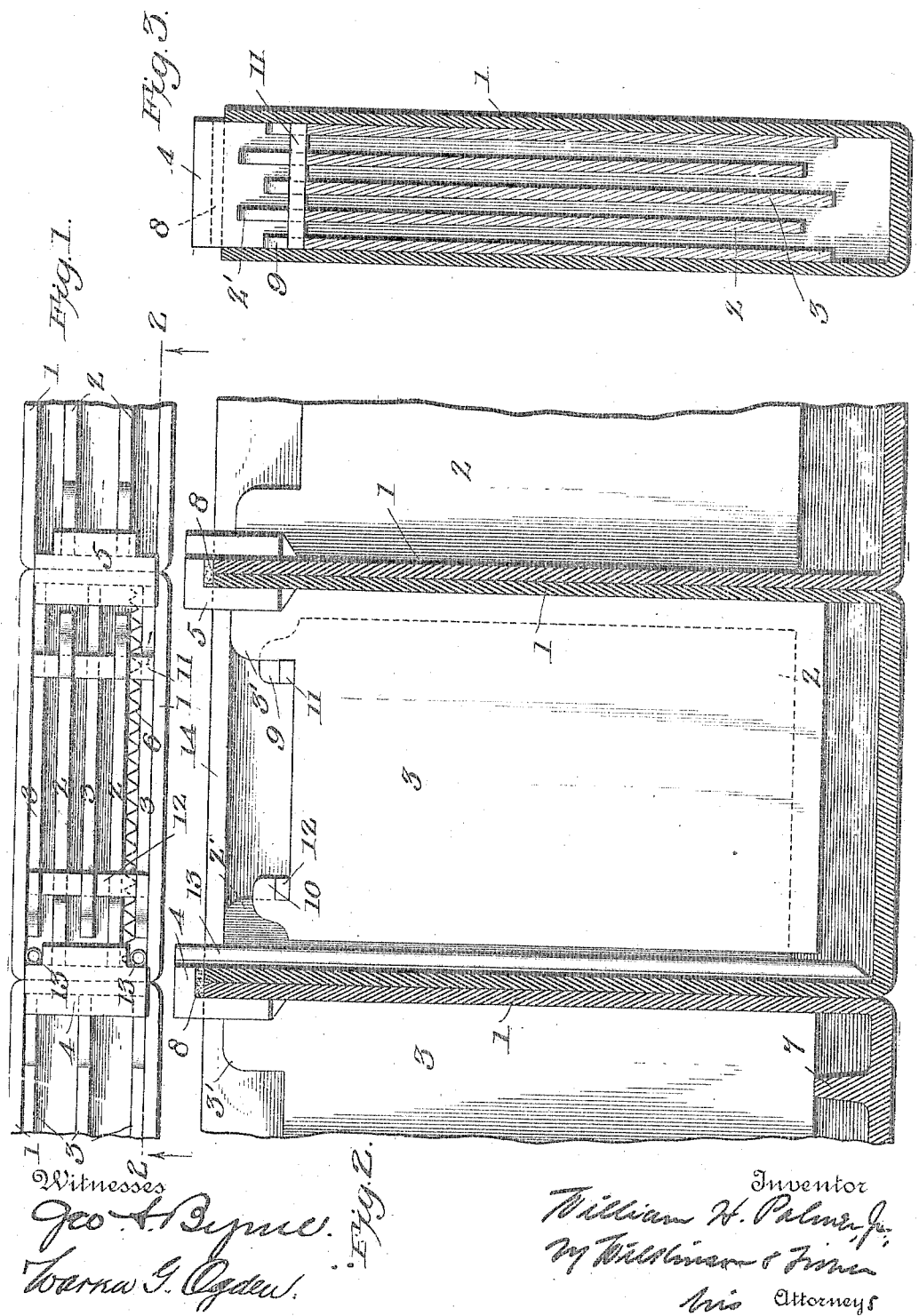

UNITED STATES PATENT OFFICE.

WILLIAM H. PALMER, JR., OF NEW YORK, N. Y.

STORAGE BATTERY.

No. 817,132.  Specification of Letters Patent.  Patented April 3, 1906.

Application filed February 14, 1905. Serial No. 245,605.

*To all whom it may concern:*

Be it known that I, WILLIAM H. PALMER, Jr., a citizen of the United States, residing at New York, in the county of New York and State of New York, have invented certain new and useful Improvements in Storage Batteries; and I do hereby declare the following to be a full, clear, and exact description of the invention, such as will enable others skilled in the art to which it appertains to make and use the same.

This invention relates to electric accumulators or storage-battery cells; and its objects, generally speaking, are to perfect a construction which will secure certain highly-desirable results in connection with the practical use and operation thereof.

More in detail, one object of the invention is to construct a cell the plates of which are so arranged as to secure a high degree of immunity from short circuits and at the same time an economy in space used—that is, the plates are so formed as to require the least excess in the length of the jar over the length of the plates and are located therein in such manner that the opportunity for the accumulation of loosened active material between the edges of the plates and the end walls of the jar and of short-circuiting through the bridging across from plate to plate of such accumulated material is reduced to a minimum.

Another object of the invention is to provide a connecting-strap between plates of opposite polarity in adjoining jars which will allow the jars to be placed in close proximity to each other and at the same time successfully support the plate attached thereto from their upper edges without increase in the size of the containing-jar.

Another object of the invention is to provide means for supporting the plates entirely from their upper portions, thus doing away with the objectionable ribs on the bottoms of the jars now generally in use, and to so arrange the supporting means that the removal of the plates, the electrolyte, and accumulated sediment from the jar when necessary is facilitated.

To the accomplishment of these objects and such others as may hereinafter appear, the invention comprises the arrangement and combinations of parts, as hereinafter described, and set forth in the claims, reference being had to the accompanying drawings, showing the preferred embodiment thereof, in which—

Figure 1 is a plan view of a battery-cell with portions of other cells at each end thereof forming a series, the covers of such cells being removed. Fig. 2 is an elevational longitudinal sectional view on line 2 2 of Fig. 1, and Fig. 3 is an elevational transverse sectional view through the center of a cell.

Referring to the drawings, 1 denotes a containing-jar, which may be of any suitable material, as vulcanite. In this jar are disposed a series of plates of opposite polarity, which are arranged alternately, as here shown, the positive plates being numbered 2 and the negative plates 3. The group of positive plates 2 are connected in any suitable manner, as by lugs 2', on one end of their upper edges with a connecting-strap 4 at one end of the jar, and in a similar manner the negative plates 3 are connected, through lugs 3', to a connecting-strap 5 at the other end of the jar. Between each of the plates I prefer to use a separator 6, which may be of any form, as an imperforate porous sheet or a perforate non-porous sheet, extending substantially the full length of the jar; but good results may be obtained with this improved arrangement of plates without the use of separators. These plates may be of any desired size and number, and the dimensions of the positive plates may differ from those of the negative plates; but it is preferable to make all the plates of substantially equal length and the negative plates of somewhat greater depth than the positive plates. All plates of the same polarlity are arranged with their side edges substantially in line; but the edges of plates of unlike polarity are staggered. This arrangement of the plates may be obtained by the selection of their size with relation to the containing-jar—that is, the preferred length of the plates should be equal to the length of the jar minus the thickness of one of the connecting-straps minus a suitable clearance. It is thus seen that when the plates of one group are attached to their connecting-strap and the strap is placed at one end of the jar the free ends of these plates extend substantially to the face of the connecting-strap for the other group of plates located at the opposite end of the jar, and the plates of each group extend from one end wall of the jar lengthwise thereof substantially to a plane drawn through the inner face of the connecting-strap at the opposite end of the jar. Such an arrangement provides for the staggering of the side edges of the plates and provides relatively large spaces through which loosened material will readily fall to the bottom of the jar. Under the arrangement of plates heretofore generally in use, where the side edges of all plates, both positive and negative, were substantially in line, if the separator used should slightly shift or chip at its edge an opportunity will be given for loosened active material to bridge across between two plates or for the corners of the plates, if they should curl, to touch each other, and thus form a short circuit within the cell; but under the present arrangement it will be noted that a considerable portion of the separating-plate must be broken off, which is unlikely to occur, before any loosened active material can bridge across between the side edges of the two plates, and, furthermore, even if such breakage occur the staggering of the plates form such a large space to be bridged over that it is not likely that a short circuit could be formed in this manner. Moreover, under the new arrangement of plates it is impossible for short circuits to occur as the result of a slight shifting of the separators or a mere chipping of their edges. The reason for constructing one group of plates of greater depth than the other, so that the bottom edges of the plates are staggered, is a similar one—that is, to obviate as far as possible the likelihood of short circuits occurring within the cell.

It has been usual heretofore in the practice of making storage-battery cells to use a connecting-strap between the two groups of plates, but to support them within the cell by means of ribs usually cast across the bottom of the cell, as shown at 7 in Fig. 2. This practice is open to two objections, the first being that some forms of positive plates increase in size with age—that is to say, they "grow"—and it is therefore desirable to hang such plates in the cells rather than to rest them on ribs in the bottom thereof, so that they may be free to grow without disarranging the connecting-straps by pushing them upward, and the second objection is that ribs in the bottom of a cell form a lodging-place for loosened active material, and by dividing the bottom portion of the cell in sections they interfere with the removal of sediment and of the electrolyte. Some negative plates also will give better results if hung and not supported on ribs. In the present instance the two groups of plates are hung in the cell in the following manner. The connecting-straps 4 and 5 for the positive and negative plates, respectively, are preferably formed with a U-section, which is inverted and slipped over the two end walls of adjacent jars, the base of the U resting directly upon the top surfaces of these end walls, and the connecting-straps are thus utilized also as supporting-straps, as in this position they will support the weight of the plates attached to them. It is found desirable to use some means for securing an even bearing for these supporting-straps on the edges of the jars, and to this end it is preferable to use a pad 8, of elastic or yielding material, interposed between the strap and the jar. In order to more evenly balance the straps, the same have plates attached to both sides thereof—that is, taking the case of strap 4, it will be noted that positive plates for the central jar (shown in the figures) are attached to one side of it, and negative plates for the jar at the left of the figures are attached to the other side of it, it supporting both these groups of plates by resting on the end walls of the two jars, as heretofore explained. Similarly in the case of strap 5 the negative plates of the central jar are attached to one of its sides and the positive plates of the right-hand jar are attached to its other side. Since it is only the positive plates which grow, it is sometimes found desirable to suspend only the positive plates, the negative plates resting directly on the bottom of the cells or on ribs formed therein, as shown by 7, and when this is done the positive plates in a jar may be supported or suspended by such negative plates in an adjacent jar, through the medium of the combined connecting and supporting strap 4, without having recourse to the upper edge of the wall of the jar as a supporting means, or, further, the positive plates may be supported in part by such negative plates and in part by the wall of the jar. By such an arrangement and owing to the selected length of the plates, as heretofore explained, it is seen that by lifting any one connecting-strap the positive plates of one jar and negative plates of an adjacent jar may be both withdrawn from the electrolyte for any desired purpose without disturbing any other group of plates or severing any connecting-strap. This is a distinct advantage in removing plates for inspection or repair, and if the plates are formed and connected in the manner described the desired end is accomplished without unnecessary waste of space either in the containing-jars or between them and with as little complication and multiplication of parts as is practicable. When the plates are light or relatively short, horizontal suspension by one upper corner, through the means just described, is sufficient; but when the plates are heavy and long it is preferable to give them some mutual or auxiliary support. To this end each of the positive plates is provided at or near its free end with a hooked lug 9, and in a similar manner each of the negative plates is provided with a hooked lug 10. Beneath these lugs are placed bars 11 and 12, respectively, of any suitable non-conducting material, which rest upon the top edges of the plates which they cross. It is not always necessary to provide both sets of lugs 9 and 10, as it may be only necessary to support one of the groups of plates by this auxiliary means and not the other. Where, for example, the negative plates rest upon the ribs 7, it is obvious that such groups need not be provided with the auxiliary means just described; but when it is desired to suspend both the groups of plates in a cell and the plates are of such size as to require support at both corners this construction of mutual support provides a particularly simple and efficient arrangement to this end. It is desirable that the plates should be so arranged in the cell that a space may be left in the corners of the cell for the insertion of a tube of fair size by means of which the electrolyte and accumulated sediment may from time to time be drawn off, the strength of the electrolyte being then adjusted and the solution replaced. The staggering of the plates heretofore described allows this to be done, as the connecting-strap covering the positive group of plates of each battery can readily be shortened to leave a space in two corners of the cell for the insertion of cleaning-tubes 13, although the straps connecting the negative plates, as here shown, must of necessity extend the full width of the cell. In order to further aid in supporting the plates, when suspended, by the means heretofore described and prevent the straps at the ends of a cell from being drawn together by the weight of the plates, should there be such a tendency, it has been found desirable to insert between them some sort of a distance-piece or brace 14, constructed to fit snugly in the space between them, which brace may be also made large enough to extend across the cell, acting as a cover and serving to close it from the entrance of dirt and other foreign matter.

It will be obvious to those skilled in the art to which this invention appertains that certain features of construction herein described are most valuable in connection with plates of pure lead of what is commonly known as the "Planté" type of plate; but the invention is not limited in the use of its construction or any part thereof to any particular type or design of plates.

It is not desired to be understood that the invention is limited to the details of construction and arrangement of parts as herein described and illustrated, as it is manifest that numerous variations and modifications may be made in the features of construction and arrangement in the adaptation of the device to various conditions of use without departing from the spirit and scope thereof. The right is therefore reserved to all such variations and modifications which properly fall within the scope of the invention and the terms of the following claims.

I claim—

1. A storage-battery cell comprising a containing-jar, a series of positive and negative plates alternately disposed therein, the two groups supported from opposite ends of the jar, and means at the upper edges of the plates constructed to provide additional mutual supporting means, substantially as described.

2. A storage-battery cell comprising a containing-jar, a series of positive and negative plates alternately disposed therein, the two groups supported from opposite ends of the jar, a hooked lug on the upper edge of each plate and a bar resting on the plates beneath said hooked lugs.

3. A storage-battery cell comprising a containing-jar, a series of positive and negative plates alternately arranged therein, the two groups supported from opposite ends of the jar, a hooked lug on the upper edge of each plate near its free end and a bar resting on the plates beneath each of the series of lugs thus formed, substantially as described.

4. A storage-battery cell comprising a containing-jar, a series of positive and negative plates alternately disposed therein, means for supporting the plates of each group independently of the other, and means for securing additional support for each group by the other group, substantially as described.

5. A storage-battery cell comprising a containing-jar, a series of positive and negative plates alternately disposed therein, means at one end of the group of positive plates and at the opposite end of the group of negative plates for supporting each group independently of the other and means at the free ends of the plates of each group for securing mutual support, substantially as described.

6. In a storage-battery cell comprising a containing-jar and a plurality of positive and negative plates alternately disposed therein, means at one end of the group of positive plates and at the opposite end of the group of negative plates for suspending each group independently of the other and means at the free ends of the plates of the positive group adapted to cause them to be further supported by the negative group, substantially as described.

7. In a storage-battery cell comprising a containing-jar and a series of positive and negative plates alternately disposed therein, means for connecting and suspending the positive plates consisting of a combined connecting and suspending strap attached to said positive plates at their upper edges and constructed to rest upon and be supported by the wall of the containing-jar and a cover constructed to fit against the said strap and secure it in position, substantially as described.

8. A series of storage-battery cells, each comprising a containing-jar and a series of positive and negative plates alternately disposed therein, combined connecting and supporting straps between the group of positive plates in one cell and the group of negative plates in an adjacent cell, and a distance-piece or brace between each pair of straps, substantially as described.

9. A series of two or more storage-battery cells each comprising a containing-jar and a plurality of positive and negative plates alternately disposed therein; a combined connecting and suspending strap constructed to rest upon the end walls of two adjacent jars and the positive plates in the one jar and the negative plates in the adjacent jar attached to and suspended from the said strap by their respective upper edges and means for securing an even bearing for the said strap between it and the jar-walls, substantially as described.

10. In a series of two or more storage-battery cells each comprising a containing-jar and a plurality of positive and negative plates alternately disposed therein; a combined connecting and suspending strap constructed to rest upon the end walls of two adjacent jars and the positive plates in the one jar and the negative plates in the adjacent jar attached to and suspended from the said strap by their respective upper edges and a pad of yielding material for forming an even bearing for said strap between the said strap and the jar-walls, substantially as described.

11. A storage-battery cell comprising a containing-jar, a series of plates of opposite polarity alternately arranged therein, the side edges of the plates of one polarity being staggered with relation to the side edges of the plates of the other polarity, means of supporting each group of plates from opposite ends of the jar, a hooked lug on the upper edge of each plate, and a bar resting across the plates beneath each of the series of hooked lugs thus formed, substantially as described.

12. A storage-battery cell comprising a containing-jar, a series of positive and negative plates alternately arranged therein, both the bottom and side edges of the plates of one polarity being staggered with relation to the corresponding edges of the plates of the other polarity, means for supporting each group of plates from opposite ends of the jar, a hooked lug on the upper edge of each plate, and a bar resting across the plates beneath each of the series of hooked lugs thus formed, substantially as described.

13. A storage-battery cell comprising a containing-jar, a series of plates of opposite polarity alternately arranged therein, the side edges of the plates of one polarity being staggered with relation to the corresponding edges of the plates of the other polarity, a combined connecting and supporting strap for the positive plates at one end of the jar, a combined connecting and supporting strap for the negative plates at the other end of the jar, means at the free ends of the plates for mutually supporting each other, the length of each plate being equal to the length of the jar, minus the thickness of one strap and minus a suitable clearance, substantially as described.

14. A storage-battery cell comprising a containing-jar, a series of plates of opposite polarity alternately arranged therein, both the side and bottom edges of the plates of one polarity being staggered with relation to the corresponding edges of the plates of the other polarity, a combined connecting and supporting strap for the positive plates at one end of the jar, a combined connecting and supporting strap for the negative plates at the other end of the jar, means at the free ends of the plates for mutually supporting each other, the length of each plate being equal to the length of the jar minus the thickness of one strap and minus a suitable clearance, substantially as described.

15. A storage-battery cell comprising a containing-jar, a series of positive and negative plates alternately disposed therein, the side edges of the positive plates being staggered with relation to the corresponding edges of the negative plates, a connecting-strap for the negative plates at one end of the jar, a combined connecting and supporting strap for the positive plates at the other end of the jar to which the positive plates are connected by their upper edges constituting suspending means for said positive plates, and the length of each plate equal to the length of the jar, minus the thickness of one strap and minus a suitable clearance, substantially as described.

16. A storage-battery cell comprising a containing-jar, a series of positive and negative plates alternately disposed therein, both the side and bottom edges of the negative plates being staggered with relation to the corresponding edges of the positive plates, a connecting-strap for the negative plates at one end of the jar, a combined connecting and supporting strap for the positive plates at the other end of the jar to which the positive plates are connected by their upper edges constituting suspending means for said positive plates, and the length of each plate equal to the length of the jar minus the thickness of one strap and minus a suitable clearance, substantially as described.

17. A storage-battery cell comprising a containing-jar, a series of positive and negative plates alternately disposed therein, the side edges of the positive plates being staggered with relation to the corresponding edges of the negative plates, a connecting-strap for the negative plates at one end of the jar, a combined connecting and supporting strap for the positive plates at the other end of the jar constituting suspending means for said positive plates, a hooked lug on the free ends of each positive plate engaging with a bar placed across the negative plates, the length of each plate being equal to the length of the jar minus the thickness of one strap and minus a suitable clearance, substantially as described.

18. A storage-battery cell comprising a containing-jar, a series of positive and negative plates alternately disposed therein, both the bottom and side edges of the positive plates being staggered with relation to the corresponding edges of the negative plates, a connecting-strap for the negative plates at one end of the jar, a combined connecting and supporting strap for the positive plates at the other end of the jar constituting suspending means for said positive plates, a hooked lug on the free end of each positive plate engaging with a bar placed across the negative plates, the length of each plate being equal to the length of the jar minus the thickness of one strap and minus a suitable clearance, substantially as described.

19. A series of two or more storage-battery cells each comprising a containing-jar and a plurality of positive and negative plates alternately disposed therein; means for connecting and suspending the negative plates in one cell and the positive plates in an adjacent cell consisting of a combined connecting and suspending strap constructed to rest upon the end walls of the jars and attached to and suspending the said negative plates in the one jar and the said positive plates in the adjacent jar by their respective upper edges, substantially as described.

In testimony whereof I affix my signature in presence of two witnesses.

WILLIAM H. PALMER, JR.

Witnesses:
H. P. C. BROWNE,
JULIAN HOWARD.